United States Patent
He et al.

(10) Patent No.: US 10,161,427 B2
(45) Date of Patent: Dec. 25, 2018

(54) SINGLE-WAY DAMPING PLUNGER CYLINDER AND FORKLIFT COMPRISING THE SAME

(71) Applicant: BYD COMPANY LIMITED, Shenzhen, Guangdong (CN)

(72) Inventors: Xiyang He, Guangdong (CN); Kuiyu Chen, Guangdong (CN)

(73) Assignee: BYD Company Limited, Shenzhen (CN)

( * ) Notice: Subject to any disclaimer, the term of this patent is extended or adjusted under 35 U.S.C. 154(b) by 369 days.

(21) Appl. No.: 15/136,365

(22) Filed: Apr. 22, 2016

(65) Prior Publication Data
US 2016/0238045 A1 Aug. 18, 2016

Related U.S. Application Data

(63) Continuation of application No. PCT/CN2014/088652, filed on Oct. 15, 2014.

(30) Foreign Application Priority Data

Oct. 24, 2013 (CN) .......................... 2013 1 0504539
Oct. 24, 2013 (CN) ...................... 2013 2 0657473 U

(51) Int. Cl.
*F15B 15/22* (2006.01)
*B66F 9/22* (2006.01)
(Continued)

(52) U.S. Cl.
CPC .............. *F15B 15/225* (2013.01); *B66F 9/22* (2013.01); *F15B 15/149* (2013.01);
(Continued)

(58) Field of Classification Search
CPC .. F15B 15/225; F15B 15/1457; F15B 15/149; F16F 9/483; F16F 9/49; B66F 9/22
(Continued)

(56) References Cited

U.S. PATENT DOCUMENTS 3,160,078 A * 12/1964 Hiemstra .............. F15B 15/204
92/107
3,264,943 A * 8/1966 Schmitt ................ F15B 15/149
91/42
(Continued)

FOREIGN PATENT DOCUMENTS

CN 201982410 U 8/2011
CN 203614499 U 5/2014
(Continued)

OTHER PUBLICATIONS

BYD Company Limited, International Search Report and Written Opinion, PCT/CN2014/088652, dated Jan. 8, 2015, 12 pgs.

*Primary Examiner* — Thomas E Lazo
*Assistant Examiner* — Richard C Drake
(74) *Attorney, Agent, or Firm* — Sheppard Mullin Richter & Hampton LLP

(57) ABSTRACT

A single-way damping plunger cylinder includes a cylinder body (3), a piston rod (4), a piston (6) and a sleeve (2), the piston (6) dividing the cylinder body (3) into a first cylinder chamber (31) and a second cylinder chamber (32), a first end of the first oil passage (40) being communicated with the first cylinder chamber (31) via the second oil passage (41) and a second end of the first oil passage (40) being communicated with the second cylinder chamber (32), the valve (5) movably disposed in the second oil passage (41) to open or close a direct communication of the first and second oil passages (40,41); a damping oil passage (50) defined in the valve (5) to communicate the first oil passage (40) with the second oil passage (41). A forklift is also provided.

15 Claims, 3 Drawing Sheets

(51) Int. Cl.
*F15B 15/14* (2006.01)
*F16F 9/49* (2006.01)
*F16F 9/48* (2006.01)

(52) U.S. Cl.
CPC .......... *F15B 15/1457* (2013.01); *F16F 9/483* (2013.01); *F16F 9/49* (2013.01); *F16F 2230/007* (2013.01)

(58) Field of Classification Search
USPC .......................................................... 92/82
See application file for complete search history.

(56) References Cited

U.S. PATENT DOCUMENTS

| | | | | |
|---|---|---|---|---|
| 3,320,861 | A * | 5/1967 | Johnson | F15B 15/204 92/14 |
| 3,665,812 | A * | 5/1972 | Hashimoto | F15B 15/12 188/365 |
| RE28,967 | E * | 9/1976 | Weiss | F15B 15/204 92/113 |
| 5,638,616 | A * | 6/1997 | Kishi | E02F 3/306 37/186 |
| 6,095,486 | A * | 8/2000 | Ivers | F16F 9/46 137/909 |
| 6,390,254 | B1 * | 5/2002 | Bennett | F16F 9/20 188/280 |
| 7,461,582 | B2 * | 12/2008 | Van der Blom | F04B 33/005 92/169.1 |
| 7,513,341 | B2 * | 4/2009 | Lachermeier | B60T 17/083 188/153 D |
| 7,568,563 | B2 * | 8/2009 | McAndrews | B62K 25/04 188/275 |
| 7,828,126 | B2 * | 11/2010 | Lun | F16F 9/537 188/267.2 |
| 8,336,166 | B2 * | 12/2012 | Kim | E05F 5/006 16/82 |
| 9,377,077 | B2 * | 6/2016 | Fitterling | F16F 9/516 |
| 9,404,553 | B2 * | 8/2016 | Yoon | F16F 9/5126 |
| 9,511,466 | B2 * | 12/2016 | Kawakami | F15B 15/2807 |
| 9,593,736 | B2 * | 3/2017 | Jordan | F16F 9/461 |
| 9,822,837 | B2 * | 11/2017 | Groves | F16F 9/48 |
| 9,879,748 | B2 * | 1/2018 | Roessle | F16F 9/369 |
| 2003/0006539 | A1 * | 1/2003 | Bertram | F16F 9/0209 267/120 |
| 2011/0024245 | A1 * | 2/2011 | Nezu | F16F 9/5126 188/283 |
| 2011/0079475 | A1 * | 4/2011 | Roessle | F16F 9/348 188/266.5 |
| 2012/0292145 | A1 * | 11/2012 | Bombrys | B60G 13/08 188/280 |

FOREIGN PATENT DOCUMENTS

| | | |
|---|---|---|
| JP | 05962704 A | 4/1984 |
| JP | 06280818 A | 10/1994 |
| JP | 09235096 A | 9/1997 |

* cited by examiner

SINGLE-WAY DAMPING PLUNGER CYLINDER AND FORKLIFT COMPRISING THE SAME

CROSS-REFERENCE TO RELATED APPLICATION

This application is a continuation application of PCT Patent Application No. PCT/CN2014/088652, entitled "SINGLE-WAY DAMPING PLUNGER CYLINDER AND FORKLIFT COMPRISING THE SAME" filed on Oct. 15, 2014, which claims priority and benefits of Chinese Patent Applications No. 201310504539.6 and No. 201320657473.X, both filed with State Intellectual Property Office, P. R. C. on Oct. 24, 2013, the entire contents of the above-identified applications are incorporated herein by reference in their entirety.

FIELD

The present disclosure relates to field of forklift, especially relates to a single-way damping plunger cylinder and a forklift comprising the same.

BACKGROUND

A hydraulic oil cylinder is widely used in different industries, especially in a lifting mechanism of a forklift, due to a working stability thereof. There are mainly two kinds of hydraulic oil cylinder used in a forklift: a piston cylinder and a plunger cylinder. In order to avoid the influence caused by mechanical collisions of a piston, a buffering component needs to be fixed in both of the piston cylinder and the plunger cylinder. Currently, a technology of a low region (i.e. a region adjacent to the bottom end of the cylinder body) buffering is maturely used in the piston cylinder and the plunger cylinder of forklift and has an excellent buffering effect.

However, because a working frequency in the low region is greatly higher than that in a high region (i.e. a region adjacent to the top end of the cylinder body), a significance of the high region buffering is usually ignored in application of forklift. In fact, mechanical collisions occurred in the high region is also very dangerous. Therefore, in order to improve a reliability and security performance of the forklift, it is necessary to add a high region buffering component in the piston cylinder or the plunger cylinder.

SUMMARY

The present invention seeks to solve at least one of the problems existing in the related art to at least some extent.

A first object of the present invention is to provide a single-way damping plunger cylinder. The single-way damping plunger cylinder includes: a cylinder body; a piston rod defining a first end extending out of the cylinder body and a second end located within the cylinder body; a piston disposed in the cylinder body and fixed to the second end of the piston rod, the piston dividing the cylinder body into a first cylinder chamber having piston rod and a second cylinder chamber without piston rod; a first oil passage and a second oil passage formed in the piston rod, a first end of the first oil passage being communicated with the first cylinder chamber via the second oil passage and a second end of the first oil passage being communicated with the second cylinder chamber; a valve disposed in the second oil passage, and configured to be moveable in the second oil passage so that to open or block the first oil passage; a damping oil passage formed in the valve and configured for communicating the first oil passage and the second oil passage when the valve moves to block the first oil passage; and a sleeve disposed on an inner surface of the cylinder body block to a top end thereof and configured to compress the valve; wherein an inner diameter of the damping oil passage is less than that of the first oil passage.

In some embodiments, an inner diameter of the sleeve is gradually decreased along a direction from bottom of the cylinder body to top of the cylinder body.

In some embodiments, the single-way damping plunger cylinder further includes s a supporting member disposed in the second oil passage and configured to support the valve.

In some embodiments, the valve includes: a right portion configured to contact the sleeve, a left portion contacting the supporting member, and a blocking portion disposed between the right and left portions and configured to block the direct communication of the first and second oil passages.

In some embodiments, the right portion, the blocking portion and the left portion are integrally formed.

In some embodiments, the right portion has a hemisphere shape, and the left portion has a taper shape.

In some embodiments, the supporting member includes a center hole therein, the left portion of the valve is configured to hermetically contact the center hole.

In some embodiments, an inner diameter of the center hole is smaller than a maximum outer diameter of the left portion.

In some embodiments, the supporting member includes a stop ring disposed within the center hole, an elastic member is disposed between the stop ring and the left portion, the stop ring defines an oil hole therein.

In some embodiments, an outer surface of the supporting member is connected to an inner surface of the second oil passage via threaded connection; an inner surface of the supporting member is connected to an outer surface of the stop ring via a threaded connection.

In some embodiments, a first end of the damping oil passage extends to a side surface of the left portion, and a second end of the damping oil passage extends to a bottom surface of the blocking portion.

In some embodiments, the single-way damping plunger cylinder further includes a wear-resisting member disposed between the piston and the cylinder body.

In some embodiments, the single-way damping plunger cylinder further includes a cylinder cover fitted on the top end of the cylinder body to seal the cylinder body.

In some embodiments, the single-way damping plunger cylinder further includes an oil inlet disposed at the bottom end of the cylinder body.

A second object of the present invention is to provide a forklift. The forklift includes a single-way damping plunger cylinder mentioned above.

With the single-way damping plunger cylinder according to the present disclosure, a valve is disposed on a first oil passage of the cylinder; a damping oil passage, which has an inner diameter less than an inner diameter of the first oil passage, is disposed in the valve; and a sleeve is disposed on an inner surface of the cylinder body and configured to drive the valve to block the direct communication of the first and second oil passages. Thus, when the piston rod moves to a high region (adjacent to the top end of the cylinder), the oil in the first cylinder chamber and the second cylinder chamber may slowly flow via the damping oil passage, therefore, a high region buffering effect may be obtained, a noise and vibration caused by mechanical collision may be reduced, and a service life of the cylinder may be increased. Also, the single-way damping plunger cylinder according to the present disclosure may have a simple structure and a low manufacturing cost.

The forklift adopting the single-way damping plunger cylinder according to the present disclosure can have a better safety performance.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1:
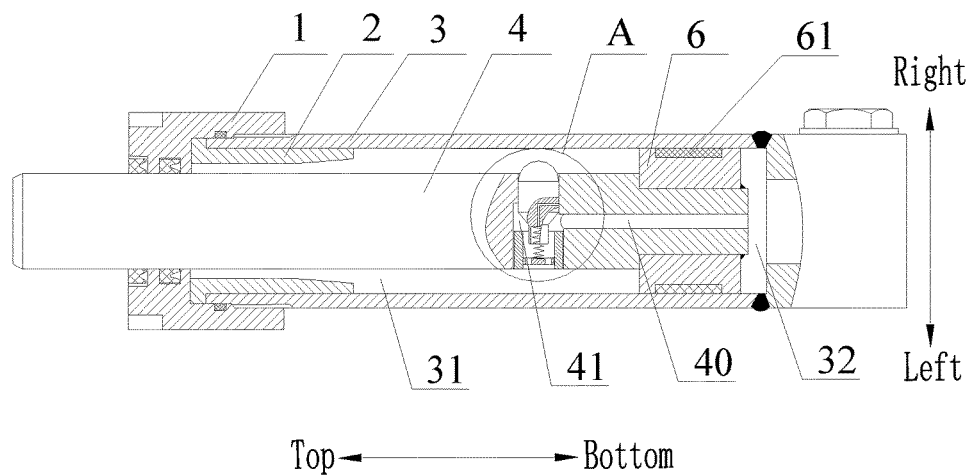
FIG. 1 is a schematic view of a single-way damping plunger cylinder in a first working state according to an embodiment of the present invention.

In order to make the problem to be solved, the technical proposal and the beneficial effects of the present invention more transparent, detailed descriptions of the present invention will be made combined with attached drawings and embodiments. It should be understood that specific embodiments described herein are just used to illustrate the present invention, and not to limit the present invention.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

Figure 2:
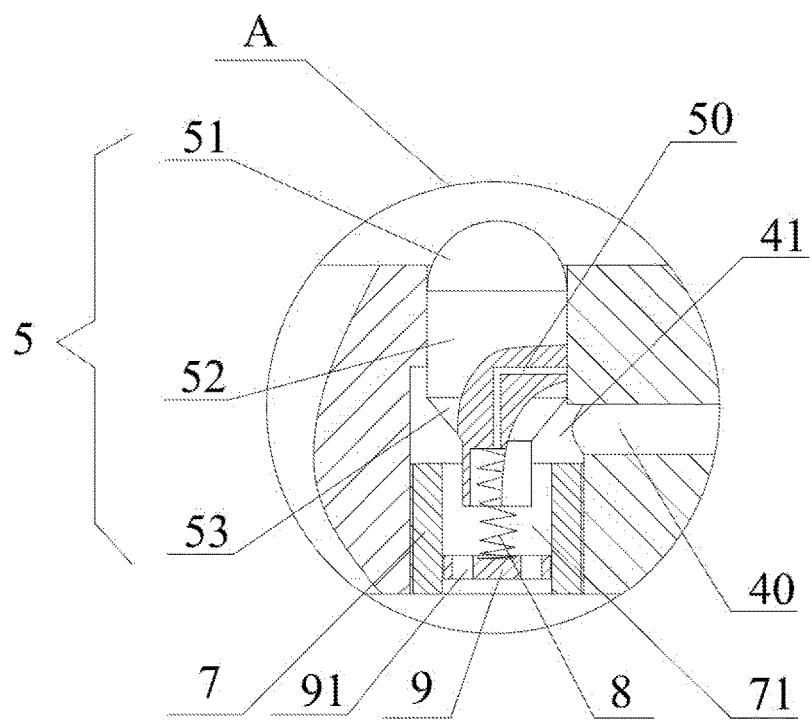
FIG. 2 is an enlarged schematic view of part A in FIG. 1.
Figure 3:
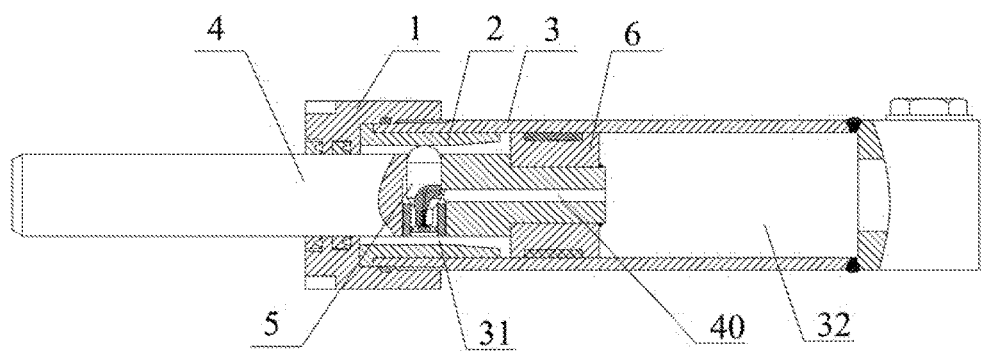
FIG. 3 is a schematic view of a single-way damping plunger cylinder in a second working state according to an embodiment of the present invention.

As shown in FIGS. 1-3, a single-way damping plunger cylinder according to embodiments of the present invention is provided. The single-way damping plunger cylinder includes a cylinder body 3 defining a top end and a bottom end, a piston rod 4 defining a first end extending out of the cylinder body 3 and a second end located within the cylinder body 3, and a piston 6 disposed in the cylinder body 3 and fixed to the second end of the piston rod 4. The piston 6 divides the cylinder body 3 into a first cylinder chamber 31 housing the piston rod 4 and a second cylinder chamber 32.

A first oil passage 40 and a second oil passage 41 are formed in the piston rod 4, a first end of the first oil passage 40 is communicated with the first cylinder chamber 31 via the second oil passage 41, and a second end of the first oil passage 40 is communicated with the second cylinder chamber 32. A valve 5 is disposed in the second oil passage 41 and moveable in a left-right direction with respect to the second oil passage 41, so as to open or block a direct communication between the first oil passage 40 and the second oil passage 41. A damping oil passage 50 is formed in the valve 5 and an inner diameter of the damping oil passage 50 is less than that of the first oil passage 40.

As stated above, the valve 5 is moveable in the left-right direction with respect to the second oil passage 41, when the valve 5 moves to a position in which the direct communication between the first oil passage 40 and the second oil passage 41 can be completely blocked, so that the first oil passage 40 and the second oil passage 41 merely is communicated by the damping oil passage 50. That is, the communication relationships (direct or indirect) between the first oil passage 40 and the second oil passage 41 are depended on the position of the valve 5 in the second oil passage 41.

Therefore, the single-way damping plunger cylinder according to the present disclosure includes a sleeve 2 disposed on an inner surface of the cylinder body 3 and adjacent to the top end of the cylinder body 3, and the sleeve 2 is configured to drive the valve 5 to block the direct communication of the first and second oil passages 40 and 41. That is, when the piston 6 and the piston rod 4 move toward and near to the top end of the cylinder body 3, the valve 5 is pushed by the sleeve 2 to move leftward in the second oil passage 41 to block the direct communication of the first and second oil passages 40 and 41. Thus, oil in the first cylinder chamber 31 and the second cylinder chamber 32 can slowly flow via the damping oil passage 50 and the buffering effect adjacent to the high region of the cylinder body 3 is obtained.

As shown in FIGS. 1-3, the sleeve 2 may be configured to push the valve 5 move leftward and stop a movement of the piston 6 toward the top end of the cylinder body 3, so that an impact of the piston 6 to the top end of the cylinder body 3 can be prevent. In some embodiments, an inner diameter of the sleeve 2 is gradually decreased along a direction from the bottom end of the cylinder body 3 to the top end of the cylinder body 3. Thus, the valve 5 may be continuously pushed by the sleeve 2 to move slowly in the second oil passage 41.

As shown in FIGS. 1-3, the valve 5 includes a right portion 51, a blocking portion 52 and a left portion 53. The right portion 51, the blocking portion 52 and the left portion 53 may be integrally formed. The right portion 51 contacts with the sleeve 2. That is, during movement of the piston 6 and the piston rod 4, as the piston 6 being adjacent to the top end of the cylinder body 3, the right portion 51 of the valve 5 in the second oil passage 41 contacts with the sleeve 2 and is pushed leftward by the sleeve 2, then the valve 5 is driven to move leftward (i.e. toward inside of the second oil passage 41). The blocking portion 52 is disposed between the left and right portions 51 and 53 and has a shape adapted to block the direct communication of the first and second oil passages 40 and 41, when the valve 5 moves leftward, the blocking portion 52 can block the direct communication of the first and second oil passages 40 and 41.

In some embodiments, the damping oil passage 50 may have a non-straight path in the valve 5, specifically, a first end of the damping oil passage 50 extends to a side surface of the left portion 53, and a second end of the damping oil passage 50 extends to a bottom surface of the blocking portion 52 facing to the first oil passage 40. When the direct communication of the first and second oil passages 40 and 41 is blocked by the blocking portion 52 of the valve 5, the oil in the first oil passage 40 can slowly circulate via the damping oil passage 50, that is, the oil in the first cylinder chamber 31 and the second cylinder chamber 32 can slowly flow via the damping oil passage 50. Therefore a buffering effect of the cylinder may be obtained.

In embodiments of the present disclosure, the inner diameter of the damping oil passage 50 is less than that of the first oil passage 40, preferably, the inner diameter of the damping oil passage 50 is much less than that of the first oil passage 40, then the buffering effect can be further improved.

As stated above, the right portion 51 of the valve 5 may contact the sleeve 2, that is, the valve 5 is pushed by the sleeve 2 from the right side of the valve 5. The right portion 51 may have a hemisphere shape so as to smoothly contact the sleeve 2.

In some embodiments, the single-way damping plunger cylinder further includes a supporting member 7 disposed in the second oil passage 41 and configured to support the valve 5, so that the valve 5 can be prevented from separating from the second oil passage 41. Specifically, the supporting member 7 defines a center hole 71 therein, the left portion 53 has a taper shaft to tightly contact the center hole 71

In some embodiments, an inner diameter of the center hole 71 is smaller than the maximum outer diameter of the left portion 53, then the supporting member 7 may be tightly fitted over a periphery of the left portion 53 to form the sealing contact between the valve 5 and the supporting member 7, the oil in the first oil passage 40 can be prevented from flowing to the first cylinder chamber 31 directly via the second oil passage 41. It should be noted that, in the present disclosure, the supporting member 7 may include a step therein (not shown in Figs), but not limit to this, then the sealing contact between the valve 5 and supporting member 7 may be formed by the left portion 53 and the step.

As shown in FIGS. 1-3, the supporting member 7 includes a stop ring 9 disposed within the center hole 71. The stop ring 9 defines an oil hole 91 therein. With the oil hole 91, when the first oil passage 40 is communicated with the damping oil passage 50, the oil may flow to the first cylinder chamber 31 from the damping oil passage 50 via the oil hole 91, then the first cylinder chamber 31 and the second cylinder chamber 32 are communicated with each other.

In some embodiments, the stop ring 9 and the left portion 53 of the valve 5 are connected via an elastic member 8, i.e. the elastic member 8 is disposed between the stop ring 9 and the left portion 53. As shown in FIG. 3, when the piston 6 and the piston rod 4 move toward the top end of the cylinder body 3, the valve 5 is pushed by the sleeve 2 to move leftward, the blocking portion 52 of the valve 5 moves to block the direct communication of the first and second oil passages 40 and 41 (at this state, the elastic member 8 is compressed, as shown in FIG. 3), the first cylinder chamber 31 is communicated with the second cylinder chamber 32 via the damping oil passage 50, then a buffering effect of the cylinder can be obtained.

As shown in FIG. 1 and FIG. 2, when the piston 6 and the piston rod 4 move toward the bottom end of the cylinder body 3 under an action of gravity, the sleeve 2 no longer push the valve 5, then the elastic member 8 is released from compression slowly, then the valve 5 is pushed by the elastic member 8 to move rightward to open the direct communication of the first and second oil passages 40 and 41.

It should be noted that there are no particular limitations for the elastic member 8. For example, in one embodiment, the elastic member 8 is a reset spring. Then the stop ring 9 may be configured to limit the elastic member 8 and regulate a predetermined pressure of the elastic member 8.

It should be noted that, both the first oil passage 40 and the dumping oil path 50 may have ring-shaped cross sections, but no limit to this. In addition, the second oil passage 41 may be designed to have a ring-shaped cross section, then, accordingly, the blocking portion 52 of the valve 5 may have a circular-shaped cross section, and the left portion 53 may be designed into a cone. In some embodiments, the supporting member 7 may be designed into a cylinder, which outside surface is a cylindrical surface, correspondingly, a cross-section shape of the center hole 71 is circular.

In some embodiments, an outer surface of the supporting member 7 is connected to an inner surface of the second oil passage 41 via a threaded connection, it should be noted that the outer surface of the supporting member 7 may be connected to the inner surface of the second oil passage 41 via other commonly-used connection method known by those skilled in the art. Similarly, an inner surface of the supporting member 7 is connected to an outer surface of the stop ring 9 via a threaded connection, but not limit to this.

In some embodiments, the single-way damping plunger cylinder further includes a wear-resisting member 61 disposed between the piston 6 and the cylinder body 3, then a contact surface between the piston 6 and the cylinder body 3 can be prevented from being damaged due to friction.

In some embodiments, as shown in FIGS. 1-3, the single-way damping plunger cylinder further includes a cylinder cover 1 fitted on top of the cylinder body 3 to seal the cylinder body 3. Then the oil in the cylinder body 3 may be prevented from being leaked off.

In embodiments of the present disclosure, the single-way damping plunger cylinder further includes an oil inlet (not shown) disposed on the bottom end of the cylinder body 3, the oil inlet is configured to input oil into the cylinder body 3 or output oil from the cylinder body 3.

The working principle of the single-way damping plunger cylinder according to embodiments of the present disclosure will be briefly described as following:

The oil is inputted into the cylinder body 3 via the oil inlet, then the oil flows into the first cylinder chamber 31 via the first oil passage 40 and the second oil passage 41, that is, the first cylinder chamber 31 and the second cylinder chamber 32 are fully filled with the oil, at this state, the valve 5 fully opens the direct communication of the first and second oil passages 40 and 41, as shown in FIG. 1 and FIG. 2.

Along with the increasing pressure, the piston rod 4 begin to move toward the top end of the cylinder body 3, a hydraulic differential circuit is formed between the first cylinder chamber 31 and the second cylinder chamber 32, the oil in the first cylinder chamber 31 flows to the second cylinder chamber 32 via the first oil passage 40 and second oil passage 41, so as to speed up the movement of the piston rod 4. No matter the oil flows from the first cylinder chamber to the second cylinder chamber, or the oil flows from the second cylinder chamber to the first cylinder chamber, the valve 5 is fully open due to the elastic member 8.

When the piston rod 4 continuously moves until the right portion 51 of the valve 5 contacts with the sleeve 2, the valve 5 is pushed to move leftward, and the elastic member 8 is compressed, then the elastic member 8 is converted into a compression state from a free state.

When the left portion 53 of the valve 5 contacts the center hole 71 of the supporting member 7, and the direct communication of the first and second oil passages 40 and 41 is blocked by the blocking portion 52 of the valve 5. Then the first cylinder chamber 31 and the second cylinder chamber 32 are merely communicated with each other via the dumping oil path 50, as shown in FIG. 3. Along with the movement of the piston rod 4, a pressure of the first cylinder chamber 31 is increasing, the oil in the first cylinder chamber 31 flows to the second cylinder chamber 32 slowly via the damping oil passage 50. Thus, a buffering effect at the high region of the cylinder can be obtained.

Figure 4:
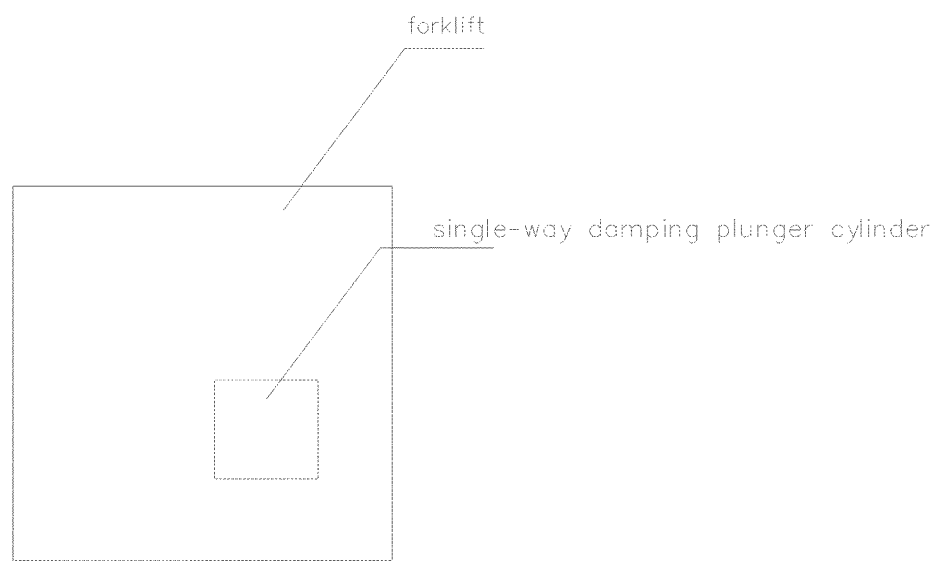
FIG. 4 is a schematic view of a forklift with a single-way damping plunger cylinder according to an embodiment of the present invention.

The single-way damping plunger cylinder according to embodiments of the present disclosure are mainly used in field of forklift, for example, a forklift with the single-way damping plunger cylinder according to embodiments of the present invention is provided, as shown in FIG. 4. It should be noted that there are no particular limitations for the application fields of the single-way damping plunger cylinder according to embodiments of the present disclosure; it may also be used in other fields.

With the single-way damping plunger cylinder according to the present disclosure, the valve 5 is disposed on a first oil passage 40 of the cylinder; the damping oil passage 50, which has an inner diameter less than an inner diameter of the first oil passage 40, is disposed in the valve 5; and the sleeve 2 is disposed on an inner surface of the cylinder body and configured to drive the valve 5 to block the direct communication of the first and second oil passages 40 and 41. Thus, when the piston rod 4 moves to the high region, the oil in the first cylinder chamber 31 and the second cylinder chamber 32 slowly flows via the damping oil passage 50, therefore, the high region buffering effect can be obtained, a noise and vibration caused by mechanical collision is reduced, and a service life of the cylinder is increased. Also, the single-way damping plunger cylinder according to the present disclosure has a simple structure and a low manufacturing cost.

The forklift adopting the single-way damping plunger cylinder according to the present disclosure can have a better safety performance. Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A single-way damping plunger cylinder, comprising:
   a cylinder body defining a top end and a bottom end;
   a piston rod defining a first end extending out of the cylinder body and a second end located within the cylinder body;
   a piston disposed in the cylinder body and fixed to the second end of the piston rod, the piston dividing the cylinder body into a first cylinder chamber and a second cylinder chamber, the piston rod located at least partially in the first cylinder chamber;
   a first oil passage and a second oil passage defined in the piston rod, a first end of the first oil passage being communicated with the first cylinder chamber via the second oil passage and a second end of the first oil passage being communicated with the second cylinder chamber;
   a valve movably disposed in the second oil passage, so as to open or block a communication of the first and second coil passages;
   a supporting member disposed in the second oil passage and comprising a center hole and a stop ring disposed within the center hole;
   a damping oil passage defined in the valve and configured to communicate the first oil passage with the second oil passage when the valve blocks the communication of the first and second oil passages, an inner diameter of the damping oil passage being less than that of the first oil passage; and
   a sleeve disposed on an inner surface of the cylinder body and adjacent to the top end of the cylinder body, and the sleeve being configured to drive the valve to block the communication of the first and second oil passages.

2. The single-way damping plunger cylinder of claim 1, wherein an inner diameter of the sleeve is gradually decreased along a direction from the bottom end of the cylinder body to the top end of the cylinder body.

3. The single-way damping plunger cylinder of claim 1, wherein the supporting member is configured to support the valve.

4. The single-way damping plunger cylinder of claim 3, wherein the valve comprises:
   a right portion configured to contact the sleeve,
   a left portion contacting the supporting member, and
   a blocking portion disposed between the right and left portions and configured to block the communication of the first and second oil passages.

5. The single-way damping plunger cylinder of claim 4, wherein the right portion, the left portion and the blocking portion are integrally formed.

6. The single-way damping plunger cylinder of claim 4, wherein the right portion has a hemisphere shape, and the left portion has a taper shape.

7. The single-way damping plunger cylinder of claim 4, wherein the left portion of the valve is configured to hermetically contact with the center hole.

8. The single-way damping plunger cylinder of claim 7, wherein an inner diameter of the center hole is smaller than a maximum outer diameter of the left portion.

9. The single-way damping plunger cylinder of claim 4, wherein an elastic member is disposed between the stop ring and the left portion, and the stop ring defines an oil hole therein.

10. The single-way damping plunger cylinder of claim 4, wherein an outer surface of the supporting member is connected to an inner surface of the second oil passage via a threaded connection, and an inner surface of the supporting member is connected to an outer surface of the stop ring via a threaded connection.

11. The single-way damping plunger cylinder of claim 4, wherein a first end of the damping oil passage extends to a side surface of the left portion, and a second end of the damping oil passage extends to a bottom surface of the blocking portion.

12. The single-way damping plunger cylinder of claim 1, further comprising a wear-resisting member disposed between the piston and the cylinder body.

13. The single-way damping plunger cylinder of claim 1, further comprising a cylinder cover fitted on the top end of the cylinder body to seal the cylinder body.

14. The single-way damping plunger cylinder of claim 1, further comprising an oil inlet disposed at the bottom end of the cylinder body.

15. A forklift, comprising the single-way damping plunger cylinder of claim 1.

* * * * *